April 8, 1969  S. ROWE  3,438,047
METHOD OF MEASURING THICKNESS OF A FILM MATERIAL
Filed Nov. 23, 1965  Sheet 1 of 3
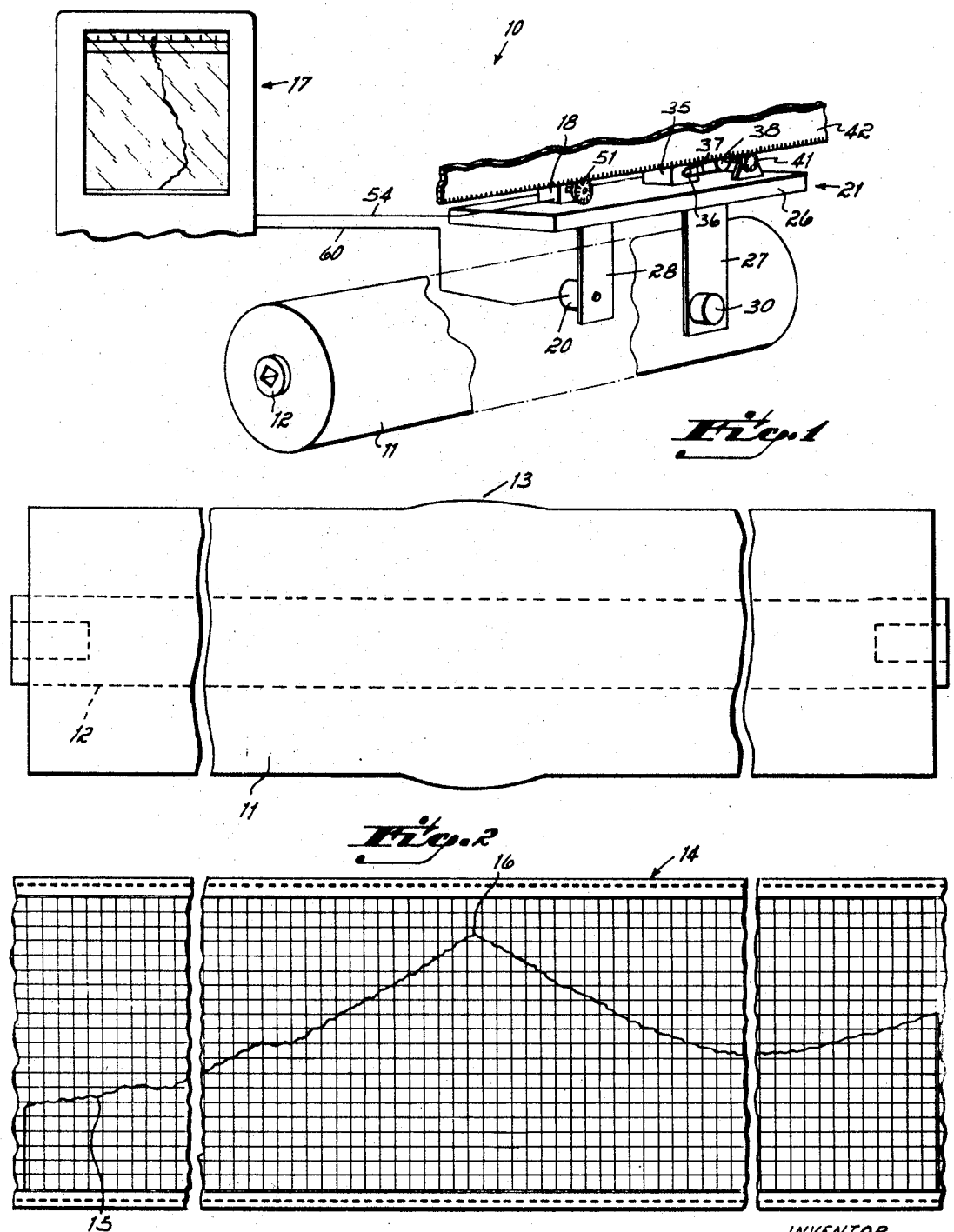

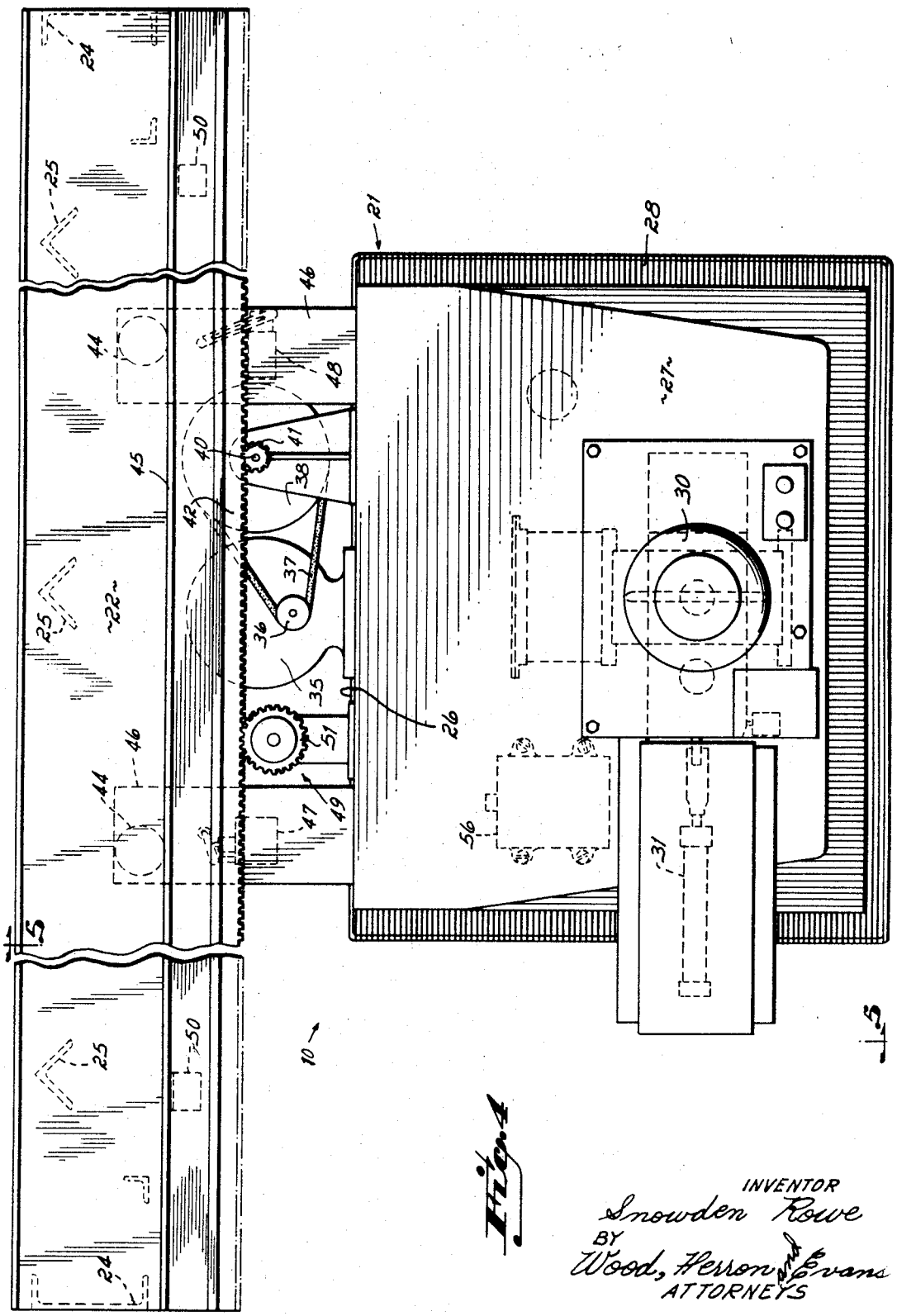

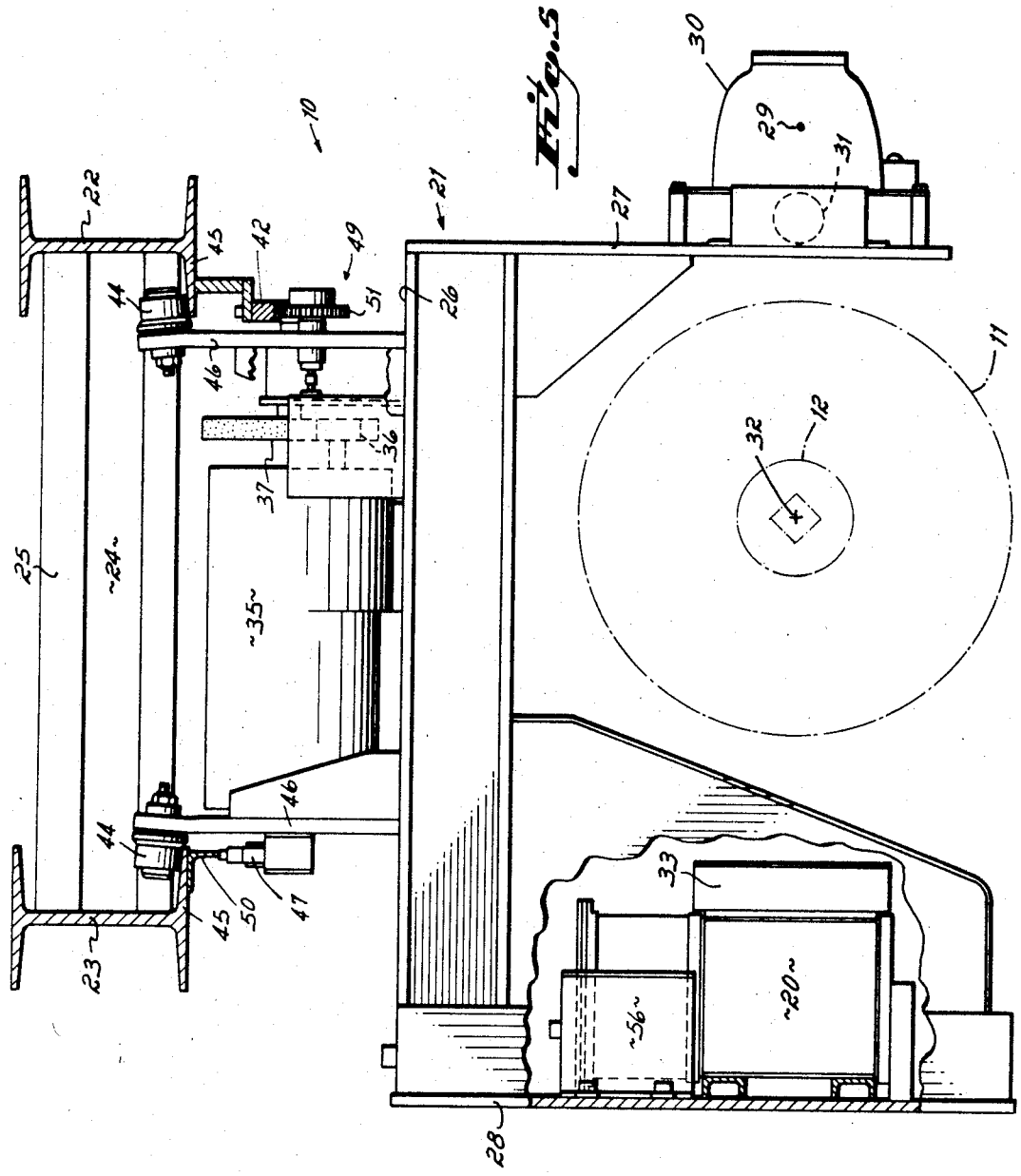

United States Patent Office 3,438,047
Patented Apr. 8, 1969

3,438,047
METHOD OF MEASURING THICKNESS
OF A FILM MATERIAL
Snowden Rowe, Cincinnati, Ohio, assignor to The Ohmart Corporation, Cincinnati, Ohio, a corporation of Ohio
Filed Nov. 23, 1965, Ser. No. 509,352
Int. Cl. G01d 9/12
U.S. Cl. 346—1                     3 Claims

ABSTRACT OF THE DISCLOSURE

A method for measuring the thickness of film material used in producing rolled products. The film thickness is measured while film is rolled on a mandrel. The measuring apparatus includes a gamma radiation source and a detector suspended from a carriage on opposite sides of the roll. The carriage is shifted parallel to the axis of the mandrel from one end of the roll to the other. The detector generates a density signal correlated with thickness of an individual convolution of film. A second signal indicates position along the roll. Signals are used to operate an X–Y recorder to form a profile chart.

---

This invention relates to apparatus for measuring the thickness of film material and is particularly directed to apparatus of this type employing a source of radioactive energy and a detector for such energy.

In the manufacture of various products, such as adhesive tapes of various kinds, one of the most important aspects of the finished product is the symmetry and uniformity of the roll. In the past there has been considerable difficulty in preventing the formation of unsymmetric or "lopsided" rolls because the rolls were made from strips of material of uneven thickness in a transverse direction. In common commercial practice, the rolls are formed from relatively narrow strips of material, which are cut from a wide supply, or mill, roll of material.

Attempts have been made to minimize the objectionable, nonuniformity of tape rolls by first measuring the thickness of the film as it passes between the mill, or supply, roll and the slitter and then adjusting the position of the slitting knives in accordance with the measurements obtained. One common form of apparatus for measuring the thickness of the sheet film is a beta gauge; for example, a gauge of the general type shown in the pending patent application of Walter B. Lloyd for "Self-Controlled Sequence for Automatic Standardization of Nuclear Gauges," Ser. No. 313,113, now Patent No. 3,348,046. In essence, such a gauge includes a source of beta radiation and a detector for radiation, such as an ionization chamber or Ohmart Cell, mounted on opposite sides of the sheet of film at a position in the path of travel of the film between the supply roll and slitter.

As is well known in the art, the detector is effective to provide an output signal which is correlated with the amount of radiation passing through the sheet from the source and impinging upon the detector. If the thickness of the sheet increases, more radiation is absorbed and less radiation impinges upon the detector. Similarly, if the thickness of the sheet decreases, more radiation impinges upon the detector. Thus, the detector output in effect provides a signal which is correlated with the thickness of the film sheet.

Beta gauges utilized in the prior art have also included means for periodically shifting the source of beta radiation and detector across the sheet to determine the thickness of the sheet at various points across its width. This scanning, or profiling of the sheet, takes place at preselected intervals; for example, every minute.

These prior art beta gauges are subjected to two severe limitations. In the first place, they are frequently incapable of detecting variations in film thickness of the minute order of magnitude which certain manufacturers desire in order to maintain quality standards. For example, if the film being produced is of a nominal thickness of one mil, i.e., one thousandth of an inch, the smallest variation which many beta gauges can detect is one hundredth of a mil. In many cases, however, it is desired to maintain the thickness of the sheet within much smaller variations; for example, one millionth of an inch or less. This represents a variation of less than one-tenth of that which can be detected by a beta gauge. As a result, it is impossible to maintain the desired degree of quality control within the limits imposed by conventional beta gauge equipment.

A further defect with beta gauges is that they only make periodic passes across the web of material. Accordingly, they are effective to sense only a narrow strip across the material and if there happens to be a slight irregularity, i.e., a short thickened area within the strip which is measured, the gauge will indicate that the slitter knife position should be changed. However, the defect sensed may be in the form, for example, of only a small, short streak, and this streak might have no effect whatsoever on the whole roll. Accordingly, the slitter will have been shifted without need.

The principal object of the present invention is to provide a method and apparatus for measuring the profile of material so that substantially smaller variations in thickness of the material can be measured than is possible with a beta gauge of the conventional type.

A further object of the present invention is to provide a means for measuring film thickness variations of the type which would adversely affect the symmetry of a tape wound from a slit portion of the film, while substantially eliminating the effect of variations which are not harmful.

More particularly, the present invention is predicated upon the concept of measuring the thickness of film material while it is still mounted upon a roll, preferably a mill roll upon which the film is wound after it is extruded. In accordance with the present invention, a source of gamma, or other radiation, such as X-rays, and a detector are mounted upon opposite sides of the mill roll including film wound about a steel, aluminum or other mandrel. Relative motion is then effected between the roll and the source and detector along a line parallel to the mandrel axis. The radiation from the detector passes through the convolutions of film material and the mandrel, and impinges upon the detector. Variations in the thickness of the film material wound upon the mandrel will cause changes in the detector output signal. As the roll is shifted relative to the source and detector so that the radiation passes through various areas of the roll from one edge to the other, a continuous profile of the thickness of the sheet material is obtained.

I have empirically determined that this profile is substantially more precise than that obtained by a beta gauge by a factor of the order of 10. In other words, the present method is able to sense variations in sheet thickness approximately one-tenth as small as those which can be detected by a beta gauge. Moreover, I have empirically determined that the small defects or variations in thickness frequently sensed by a beta gauge during one pass across the sheet, tend to average themselves out over the entire longitudinal extent or length of the sheet. The detector of the present system senses simultaneously the thickness of a large number of portions of the sheet extending over the entire length of the sheet. Thus, the present system actually senses only those variations in thickness which extend over a substantial length of the sheet and which should, accordingly, be taken into account in positioning the slitter knives. Thus, the present system provides not only a signal which detects smaller changes in thickness of the sheet than would be measured previously, but also a signal which reflects only those defects in the sheet which should be taken into account in positioning the slitter knives.

One preferred form of apparatus constructed in accordance with the principles of the present invention comprises an overhead rail structure which supports a carriage. The carriage in turn includes two depending spaced members, one of which carries a radiation source and the other of which carries a suitable detector. These arms are spaced apart a distance greater than the diameter of mill rolls to be measured. The carrier further includes drive means for reciprocating the carrier along the rails.

In use, a mill roll is placed between the two arms of the carrier so that radiation passes from the source diametrically across the mill roll and impinges upon the detector. The carriage is then shifted from one end of the mill roll to the other so that the detector is effective to produce a continuous signal which reflects the amount of radiation impinging upon the detector and, hence, the thickness of the material wound upon the roll. At the same time, a second signal is generated; for example, by a potentiometer rotated in accordance with movements of the carriage. This second signal indicates position of the carriage along the roll. These two signals, the position signal from the potentiometer and the thickness signal from the detector, are applied to an X–Y recorder, each signal being effective to shift the recorder pen along one of the coordinate axes. This recorder is effective to produce a profile of the roll showing the thickness of the roll (and hence the film thickness) at each point across its width.

These and other objects and advantages of the present invention will be more readily apparent from the following detailed description of the drawings illustrating a preferred embodiment of the invention.

In the drawings:

FIGURE 1 is a diagrammatic perspective view of one mill roll scanner system constructed in accordance with the principles of the present invention.

FIGURE 2 is a semidiagrammatic elevational view of a portion of a mill roll showing its imperfections in exaggerated form. (This imperfection may not in fact be visible.)

FIGURE 3 is a view of a chart showing the profile of the portion of the roll shown in FIGURE 2.

FIGURE 4 is a front elevational view of the mill roll scanner shown in FIGURE 1.

FIGURE 5 is a cross sectional view taken along line 5—5 of FIGURE 4.

As is diagrammatically shown in FIGURE 1, one preferred form of mill roll scanner 10 of the present invention is adapted to measure the profile of a roll 11 of sheet film, such as polyethylene, Mylar, cellophane or the like, wound upon a suitable mandrel 12 formed of aluminum, steel or other material. In a typical installation, the sheet may be one hundred inches wide and the roll may be wound on a hollow mandrel four or five inches in diameter. The outer diameter of a typical roll might be twenty inches.

One roll of film is shown in elevation in FIGURE 2. This roll is a mill roll, i.e., a roll which is formed by winding a core with film as the film emerges from a film extruder. As shown in FIGURE 2 in greatly exaggerated form, the roll 11 includes a circumferential band 13 which corresponds to a longitudinal band, or area, on the film strip of slightly greater thickness than the remaining portions of the film. In most instances, this band is not visible. Nor can it be sensed by touch or by the difference in sound as various portions of the roll are struck by a stick or the like. In a typical manufacturing operation, film is fed from mill roll 11 to a slitting device which cuts the film into a plurality of narrow strips, for example, strips one inch wide. These strips are coated with a suitable adhesive, or the like, to form familiar adhesive tape products.

In order to avoid the formation of uneven rolls of tape, it is desirable that the position of the slitter knives be adjusted so that a thickened area, such as band 13, is disposed near the middle of a strip, not at one edge. The present apparatus and method provides means for accurately sensing the presence of any irregularity, such as band 13, and for accurately locating the position of these irregular areas relative to the width of the roll.

More particularly, the present mill roll scanner is effective to provide a profile chart 14, a portion of which is shown in FIGURE 3. As there shown, in chart 14 the "X" axis, or abscissa values, correspond to position along the width of the roll, while the "Y" axis, or ordinate values, correspond to film thickness. As shown in FIGURE 3, the profile line 15 of the roll shown in FIGURE 2 contains a peak area 16 corresponding to the precise position of band 13. By viewing a profile chart, such as chart 14, a workman can readily position the slitter rolls so that band 13 is positioned midway between slitting cutters.

Chart 14 is produced in a recorder, such as recorder 17, shown in FIGURE 1. In the preferred embodiment shown, recorder 17 is an X–Y recorder. In the present system, two input signals are applied to recorder 17. One signal is from a radiation detector 20 and the second signal is from a position potentiometer 18. These signals provide information regarding the thickness of the film and the corresponding transverse position of the thickness respectively.

As shown diagrammatically in FIGURE 1 and in detail in FIGURES 4 and 5, one preferred embodiment of the present mill scanning apparatus comprises a shiftable carriage 21. This carriage is supported for reciprocating horizontal movements in any suitable manner, such as by means of spaced rails 22 and 23. These rails may be of any suitable construction, such as spaced I-beams, the ends of which are interconnected by channel members 24 and the intermediate portions of which are interconnected by angle braces 25.

Carriage 21 comprises a horizontal platform portion 26 and two spaced depending arms 27 and 28 which are carried by platform member 26. These depending arms are spaced apart a distance greater than the diameter of roll 11. Arm 27 carries a housing 30 in which is mounted a source 29 of radioactive material. This source of radioactive material 29 is preferably a gamma source, such as Cesium 137; although it is contemplated that other sources and types of radiation, such as cobalt or X-ray radiation, can be employed. Housing 30 provides a shield for the source of radiation and includes an opening facing roll 11. This opening is adapted to be closed by any suitable form of shutter or absorber plate. The exact details of this shutter constitute no part of the present invention. As shown in FIGURE 4, the absorber plate is adapted to be withdrawn from registry with the opening in housing 30 to expose the source by means of a pneumatic cylinder 31. This cylinder is actuated to open the shutter through a conventional electrical and pneumatic circuit, not shown.

The opposite arm of the carriage, arm 28, carries detector 20. Detector 20 may be of any suitable form; for example, an ionization chamber, Geiger-Muller tube or the like. In the preferred embodiment shown, detector 20 is an Ohmart Cell. The general principles of construction and operation of this type of cell are disclosed in Philip E. Ohmart United States Patent No. 2,763,709 for "Control Device."

Detector 20 and the source of radiation mounted within housing 30 are mounted in horizontal alignment with the axis 32 of the mill roll 11. Two spaced, vertically disposed, collimating plates 33 are disposed on opposite sides of the detector 20 to limit the radiation impinging upon the detector from source 29 to radiation passing directly through the convolutions of film and mandrel 12. It is to be understood that the mill roll is mounted upon a pallet, or other support member, which is positioned beneath arms 27 and 28 with the axis 32 of the roll parallel to rails 22 and 23.

Carriage 21 is provided with an electric motor drive for traversing the carriage, or driving it back and forth along rails 22 and 23 so that the radiation source 29 and cell 20 are shifted along a path extending at least from one edge of the roll 11 completely across the roll to the opposite end of the roll. More particularly, this drive includes an electric motor 35 mounted upon the platform member 26 of the carriage. The motor output shaft carries a pulley 36 which drives a V-belt 37. The V-belt 37 is trained over a large diameter pulley 38 mounted upon a shaft 40. Shaft 40 also carries a small pinion 41 in driving engagement with a rack 42. Rack 42 is mounted beneath rail 22 and extends parallel to the rail. Consequently, motor 35 is effective when rotated in one direction to cause the carriage to be shifted along the rails in one direction and when the motor is reversed, the carriage direction is reversed.

As best shown in FIGURES 4 and 5, the carriage is suspended from the rails by means of four sets of rollers 44 which engage the lower flanges 45 of the rails. The rollers 44 are in turn mounted upon upstanding brackets 46 welded or otherwise secured to the carriage. The reciprocating movements of the carriage can be controlled in any suitable manner, such as by means of limit switches 47 and 48, which cooperate with depending switch actuating members, such as member 50, disposed to trip the switches when the radiation source and detector have passed beyond the edges of the roll. The circuits for controlling motor operation so that the motor is reversed when limit switches are actuated are well known. One suitable form of drive circuit is shown in Walter B. Lloyd United States patent application Ser. No. 313,113, now Patent No. 3,348,046. Alternatively, the operation of drive motor 35 can be controlled by a dynamic scan control of the type shown in the pending patent application of Snowden Rowe for "Scanning Device," Ser. No. 492,712, filed Oct. 4, 1965, and now abandoned. In any case, the details of this control constitute no part of the present invention.

In addition to the elements described, the carriage 21 also carries potentiometer 18. Potentiometer 18 is interconnected through a gear reduction assembly 49 to a pinion 51, which pinion in turn engages rack 42. Consequently, the position of the tap of potentiometer 18 changes as the carriage moves along the rails and pinion 51 is rotated by its engagement with rack 42. The potentiometer 18 is thus effective to produce an electrical signal correlated with the position of the carriage relative to the ends of roll 11. This signal is applied to the recorder through lead 54 as shown in FIGURE 1. The potentiometer, or position reference signal, is utilized in an X–Y chart drive to control the position of the recording pen along the X, or abscissa, axis.

In the specific embodiment shown in FIGURES 4 and 5, the carriage also supports a housing 56 which encloses a preamplifier. This preamplifier is effective to amplify the output signal from detector 20 before that signal is applied to recorder 17 through lead 60.

In operation, a mill roll is placed under carriage 21 between arms 27 and 28. The axis 32 of the mill roll extends parallel to the path of travel of the carriage. When a series of rolls are to be scanned, each of the rolls is positioned in the same position relative to arms 27 and 28. Any suitable form of guide markings or devices can be utilized to effect this position. After the roll has been positioned, the shutter associated with radiation source holder 30 is opened to allow the radiation from source 29 to radiate toward detector 20. Motor 35 is then energized to cause the carriage to move along the rail axis. As the carriage is brought to a position where the source and detector are in registry with the end of the roll, the radiation impinging upon the detector is attenuated by the mill roll. As the thickness of the convolutions of the material vary along the width of the roll, more or less material will be interposed between the source and detector. Consequently, a greater or lesser quantity of radiation will be absorbed and the amount of radiation impinging upon the detector will be altered correspondingly.

It is to be understood that the output of the detector 20 depends directly upon the amount of radiation impinging upon the detector. Hence, this detector output is also correlated with the amount of material interposed between the source and detector at a given time. I have empirically determined that this also provides a very accurate correlation with the thickness of individual convolutions of the film. The detector output is amplified and the amplified signal is then applied to recorder 17. At the same time, potentiometer 18 is effective to produce a signal indicating the position of the carriage along the roll.

The potentiometer signal drives the recorder pen along the X axis of the chart, while the output signal from the detector controls the ordinate, or Y, position of the pen. The combination of the X and Y coordinate movements results in a profile chart, such as that shown in FIGURE 3. The chart shows the total thickness of the roll at various positions along its width. Thus, by examining a chart, such as chart 14, it can readily be determined from peak 16 that a thickened area, or band 13, occurs at a particular distance from the end of the roll. This band, of course, corresponds to a longitudinal strip of increased area in the film. By taking note of the position of this band, the slitter operator can adjust the transverse position of the cutting knives to center the band in an individual strip and thereby achieve optimum uniformity of appearance of the strips. The profile of FIGURE 3 is made with a system incorporating conventional zero suppression such as that disclosed in Walter B. Lloyd application Ser. No. 313,113, now Patent No. 3,348,046. If no zero suppression is employed, a mirror image of the chart will be obtained.

After the source and detector have passed beyond the far end of the mill roll, the motor drive is stopped or reversed by one of the limit switches 47, 48 or in a suitable manner, such as by means of a dynamic scan control circuit as mentioned above.

From the foregoing disclosure of the general principles of the present invention and the above description of a preferred embodiment, those skilled in the art will readily comprehend various modifications to which the present invention is susceptible. For example, while in the exemplary embodiment shown the source and detector have been moved while the roll has remained stationary, in other embodiments it may be preferable to hold the source and detector stationary while shifting the roll axially relative to the source and detector.

Also, while recorder 17 in the preferred embodiment of the invention is preferably an X–Y recorder, it is contemplated that a strip chart recorder can be used in which movements of the chart along the X axis are timed in a conventional manner relative to the movements of the source and detector to provide an accurate profile of the mill roll over its length. One suitable manner of accomplishing this is to use synchronous motors for the carriage drive and chart drive.

Having described my invention, I claim:

1. A method of determining the amount and position of variations of the thickness of a film material to be used in forming a rolled product, said method comprising the steps of winding said film about a mandrel, disposing said mandrel having said film material wound thereon intermediate a source of gamma radiation and a detector for radiation, said source and detector being disposed on opposite sides of the axis of said roll, effecting relative movement between said mandrel and said source and detector in a direction parallel to the axis of said mandrel, whereby the radiation impinging upon said detector is attenuated by said film, utilizing said detector to develop a signal correlated with the thickness of said film material, generating a second signal correlated with the position of said source and detector relative to the transverse dimension of said roll of film, applying said signals to a recorder and utilizing said recorder to derive a profile chart of said film.

2. A method of determining the amount and position of variations of the thickness of a film material to be used in forming a rolled product, said method comprising the steps of winding said film about a mandrel, disposing said mandrel having said film material wound thereon intermediate a source of gamma radiation and a detector for radiation, said source and detector being disposed upon opposite sides of the axis of said roll, effecting relative movement between said mandrel and said source and detector in a direction parallel to the axis of said mandrel, whereby the radiation impinging upon said detector is attenuated by said film, utilizing said detector to develop a signal correlated with the thickness of said film material, employing said signal to produce a profile record of the thickness of said film material.

3. A method of analyzing a film for imperfections which would adversely affect the uniformity of tapes manufactured from said film, said method comprising the steps of winding said film about a mandrel, disposing said mandrel having said sheet material wound thereon intermediate a source of gamma radiation and a detector for radiation, said source and detector being disposed upon opposite sides of the axis of said roll, effecting relative movement between said mandrel and said source and detector in a direction parallel to the axis of said mandrel, whereby the radiation impinging upon said detector is attenuated by said film, utilizing said detector to develop a signal correlated with the thickness of said sheet material, generating a second signal correlated with the position of said source and detector relative to the transverse dimension of said roll of film, applying said signals to a recorder and utilizing said recorder to derive a profile chart of said film.

References Cited

UNITED STATES PATENTS

| 2,370,163 | 2/1945 | Hare | 250—83 |
| 2,486,902 | 11/1949 | Wolf | 250—83 |
| 2,748,290 | 5/1956 | Reichertz | 250—83 |
| 3,136,892 | 6/1964 | Willett et al. | 250—83 |
| 3,007,052 | 10/1961 | Hickman et al. | 250—83 |
| 3,244,881 | 4/1966 | Hansen et al. | 250—83 |
| 3,248,545 | 4/1966 | Hansen | 250—83 |

RICHARD B. WILKINSON, *Primary Examiner.*

JOSEPH W. HARTARY, *Assistant Examiner.*

U.S. Cl. X.R.

250—83.3; 346—33